Dec. 3, 1940.　　　　D. M. ANDERSON　　　　2,223,346
METHOD OF MAKING THERMOPLASTIC TRIM
Filed Feb. 17, 1938　　　3 Sheets-Sheet 1

INVENTOR.
DWIGHT M. ANDERSON
BY
HIS ATTORNEY.

Dec. 3, 1940.　　　D. M. ANDERSON　　　2,223,346
METHOD OF MAKING THERMOPLASTIC TRIM
Filed Feb. 17, 1938　　　3 Sheets-Sheet 2

INVENTOR.
DWIGHT M. ANDERSON
BY
HIS ATTORNEY.

Dec. 3, 1940.   D. M. ANDERSON   2,223,346
METHOD OF MAKING THERMOPLASTIC TRIM
Filed Feb. 17, 1938   3 Sheets-Sheet 3

INVENTOR.
DWIGHT M. ANDERSON
BY
HIS ATTORNEY.

Patented Dec. 3, 1940

2,223,346

UNITED STATES PATENT OFFICE 2,223,346

METHOD OF MAKING THERMOPLASTIC TRIM

Dwight M. Anderson, Cleveland Heights, Ohio, assignor, by mesne assignments, to The Standard Products Company, Port Clinton, Ohio, a corporation of Ohio Application February 17, 1938, Serial No. 191,052

2 Claims. (Cl. 18—55)

This invention relates generally to a one-piece decorative trim strip of thermoplastic material, such as cellulose acetate, the strip being in the form of a single-turn convolution with the end surfaces thereof complementary and disposed in slightly spaced relation, and also to the method and apparatus for making the same. More specifically, the invention is directed to a decorative frame member of this character which is generally of channel-shaped cross section and having relatively thin walls, the opening of the channel facing substantially in the direction of a surface defined by one peripheral edge of the frame member.

An important object of the invention is to provide a trim member or frame which is made of thermoplastic material or the like which is molded in the form of a single convolution or a single-turn spiral of the proper cross sectional shape and length, the end surfaces of the convolution being disposed in slightly spaced relation and provided with accurate complementary fitting faces.

Another important object is to provide a one-piece trim member of thermoplastic material having a channel-shaped cross section, the opening in the channel facing substantially in the direction of a surface defined by one peripheral edge of the frame member and being in the form of a convolution, the ends of which are disposed in slightly spaced relation to each other and provided with complementary fitting surfaces which, when sprung into fitting relation, provide a frame member having a continuous perimeter.

An equally important object is to provide an inexpensive thermoplastic frame member which is attractive in appearance and which will retain its attractiveness much longer than prior frames of painted sheet metal.

A more specific object is to provide a method of molding a single frame-forming strip of thermoplastic material or the like which is of channel-shaped cross section, the opening of the channel facing substantially in the direction of a surface defined by a peripheral edge of the frame member so that the molded member may be conveniently stripped from the mold in a single piece.

Another specific object is to provide a mold having only two separable sections for forming a one-piece frame member of thermoplastic material having a substantially uniform channel-shaped cross section, the open end of the channel facing in the direction of a surface defined by a peripheral edge of the member.

Other objects will become apparent from a consideration of the following specification and occompanying drawings.

Figure 1:
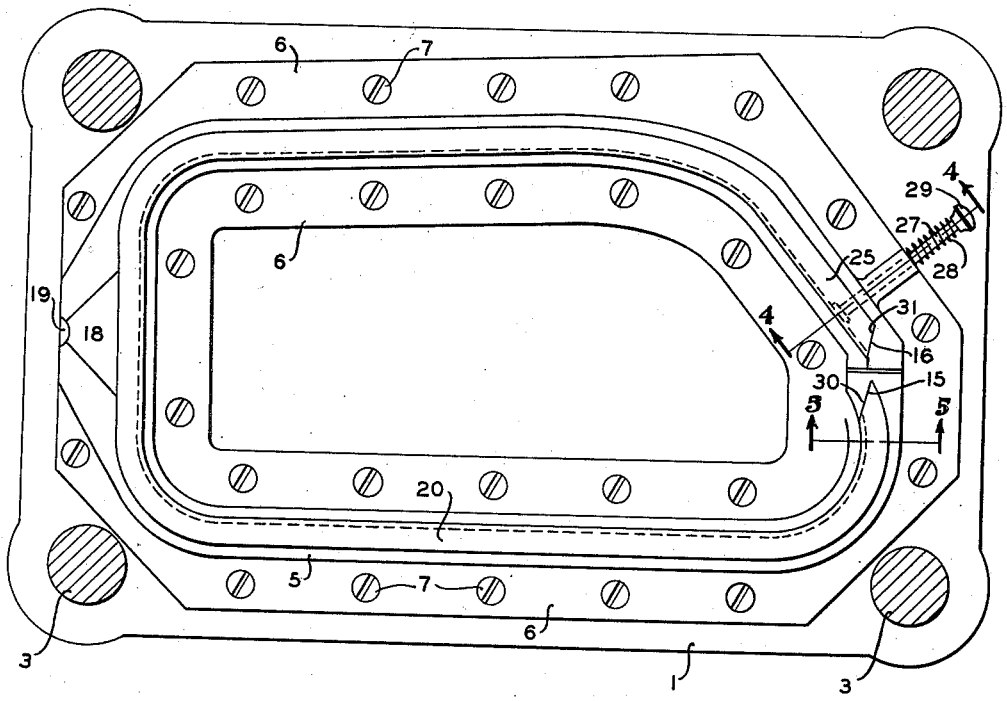
Fig. 1 is a plan view of one of the mold sections for making the frame member.
Figure 2:
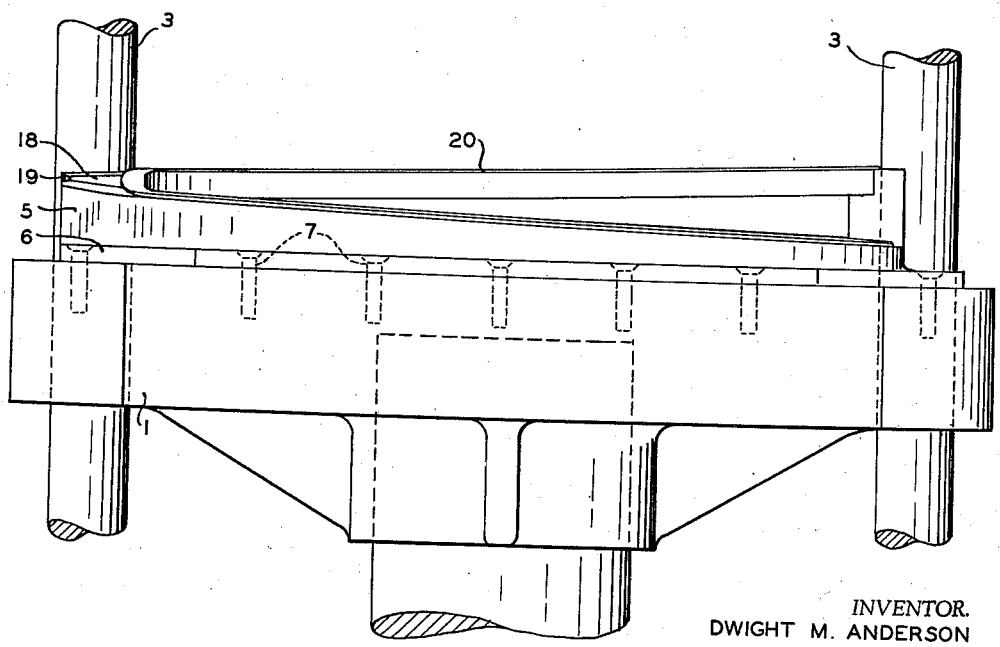
Fig. 2 is a side elevation of the mold section shown in Fig. 1.

The molded frame member illustrated is particularly adapted for use in connection with window openings for automobile doors. It is to be understood, however, that the structure may be modified to include trim members for other openings or for use in connection with exterior peripheral trim without departing from the spirit and scope of the invention.

Referring to the drawings, the apparatus for making the trim member is preferably an injection type mold and comprises a pair of relatively movable platens 1 and 2 which are arranged for movement relatively toward and away from each other. These platens are guided to insure accurate rectilinear movement by means of guide posts 3. Any suitable means may be utilized for moving the platens relatively, such as a hydraulic piston and cylinder mechanism (not shown).

Mounted on the lower platen 1 is a suitable die member 5 which is provided on its lower side with flanges 6. These flanges accommodate screws or bolts 7 which pass therethrough to join the die member to the platen.

The upper platen 2 has mounted thereon a co-operating die member 8 which is likewise provided with flanges 9 similar to the flange 6 for the purpose of securing the die in rigid mounted position on the platen. The general peripheral shape of the die members 5 and 8 is substantially the same as the shape of the frame member to be molded.

The upper part of the die member 5 is provided with a mold cavity surface 10 which forms the normally concealed portion of the molded frame member. The upper die member 8 is provided with a cooperating mold cavity surface 12 which forms the finished face of the frame member. Each of the die members 5 and 8 is also provided with a substantially flat face on each side of its associated mold cavity surface. These flat faces provide a suitable land or stop for the die members when they become engaged with each other.

Figure 4:
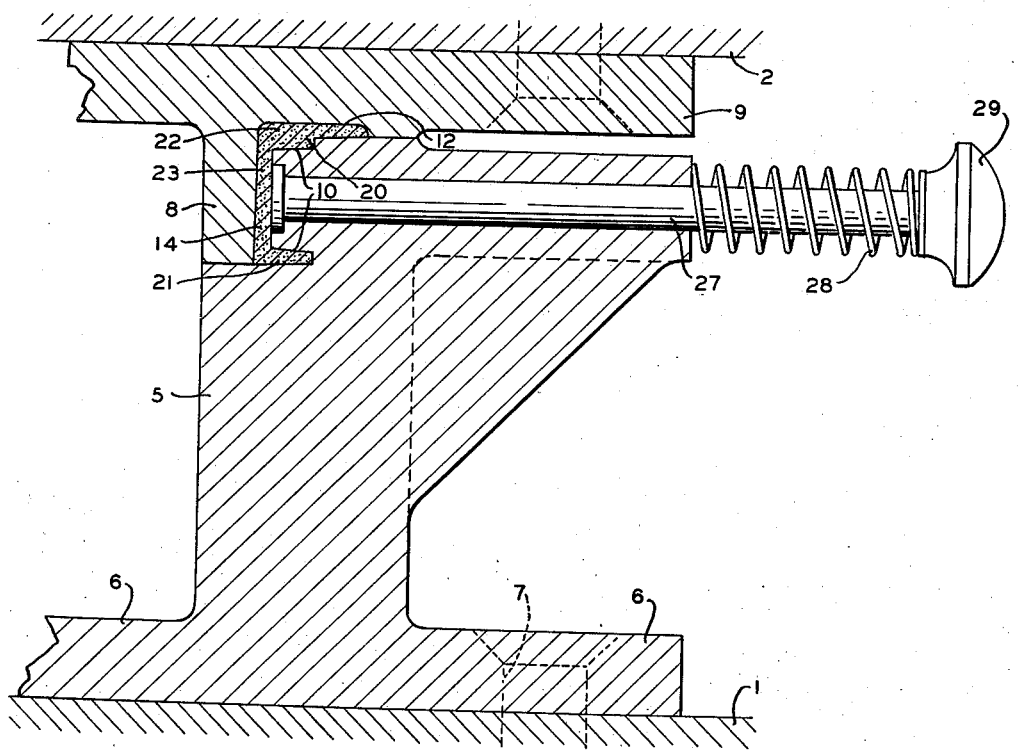
Fig. 4 is an enlarged fragmentary sectional view through the mold and is taken substantially along the line 4—4 in Fig. 1.
Figure 5:
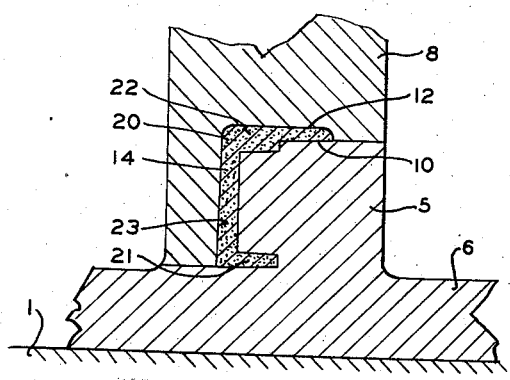
Fig. 5 is another enlarged fragmentary sectional view through the mold taken substantially along the line 5—5 of Fig. 1.

When the die members 5 and 8 are brought into engagement with each other, as indicated in Figs. 4 and 5, the mold cavity surfaces 10 and 12 together define a frame-forming cavity 14, the cross section of which is generally channel-shaped. It will be noted that the mold cavity surface 10 forms the inner surface of the channel, and the cooperating cavity surface 12 forms the outer surface thereof.

The entire frame-forming cavity 14 defines a single-turn convolution, the ends of the cavity convolution being blocked by transverse walls 15 and 16 which are slightly spaced from each other, as best shown in Fig. 1.

It will be noted from this figure also that the peripheral shape of the cavity convolution 14 is slightly warped so that the end walls 15 and 16 may be conveniently disposed in spaced relation so as to facilitate removal of the molded member from the die section.

Leading into the cavity convolution 14 is a suitable gate 18 which in the present instance is shown disposed on the opposite side of the convolution from the ends 15 and 16. This gate is communicated with a recess 19 on the exterior of the mold members 5 and 8. This recess is designed to accommodate the end of an injecting nozzle (not shown), the injecting nozzle being employed for forcing the thermoplastic material in the plastic state into the cavity under pressure. Thus the material is forced from the injecting nozzle through the gate 18, where it flows around the cavity convolution 14 in opposite directions until the cavity is completely filled to the end walls 15 and 16. The thermoplastic material thus injected into the cavity 14 produces a frame-forming convolution 20 having edge flanges 21 and 22 and a transverse side portion 23 connecting the edge flanges.

After the cavity has been completely filled, the platens 1 and 2 are separated. The die member 8 is drawn relatively away from the die member 5, but the molded frame convolution remains associated with the lower die member 5 because of the channel forming surface 10 therein. The molded piece is then ready to be removed from the die.

In order to strip the molded frame convolution 20 from the die member 5, one of the end portions 25 of the convolution is first pushed in a direction away from the channel-shaped opening thereof until the edge flanges 21 and 22 are entirely free from the surface 10. The operator may then grasp this end portion 25 with his hand and further distort the convolution in the same direction until the remainder thereof is entirely free from the die 5.

To facilitate the initial stripping operation, a suitable ejecting pin 27 may be employed which engages the inner face of the transverse portion 23 of the convolution 20. This ejecting pin is shown suitable for manual operation, but it may be associated with a suitable drive for power operation. When the manual ejecting pin is employed, a suitable return spring 28 may be used to act between an abutment on the die 5 and an operating knob 29 on the outer end of the pin.

Figure 6:
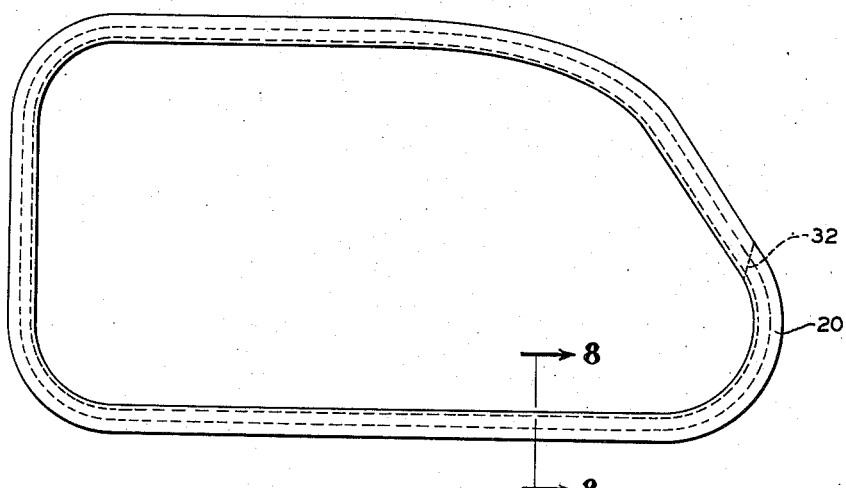
Fig. 6 is a plan view of the mold frame member with the complementary end surfaces of the convolution in fitted and mating relation.
Figure 7:
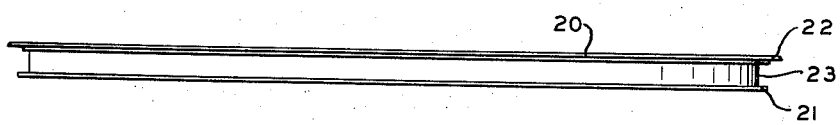
Fig. 7 is a side view of the frame member in Fig. 6.
Figures 8, 9:
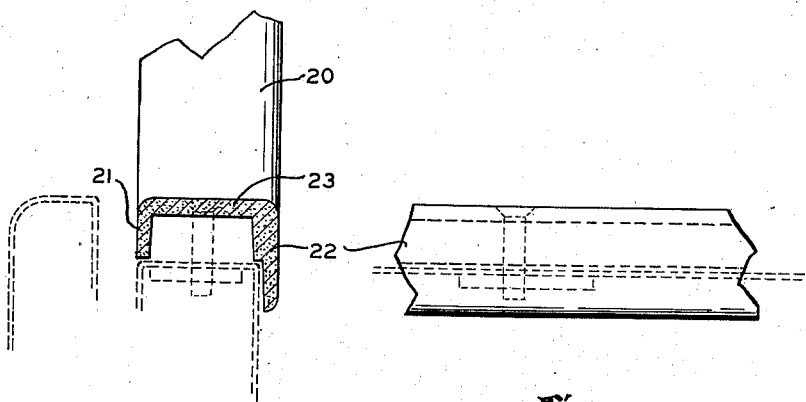
Fig. 8 is an enlarged fragmentary sectional view of the frame member in installed position around a window frame opening of an automobile door.
Fig. 9 is a fragmentary elevation of the frame member shown in Fig. 8.

The transverse end walls 15 and 16 provide accurate complementary fitting surfaces 30 and 31, respectively, on the ends of the molded convolution 20 which fit together to form an invisible joint as shown by the dotted transverse line 32 in Fig. 6. To permanently hold these ends together, the end surfaces 30 and 31 may be treated with a thin film of an adhesive such as acetone and then tightly compressed together until the adhesive dries.

Figure 3:
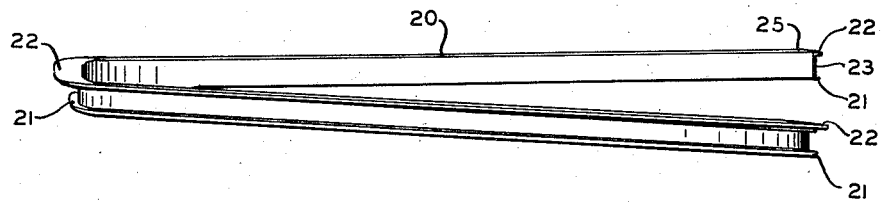
Fig. 3 is a side elevation of the molded thermoplastic frame after it has been stripped from the mold.

The peripheral shape of the cavity convolution 14 in the present instance is in the form of a spiral, the end 15 thereof being relatively close to the surface of the platen 1, and the opposite end 16 being positioned at a greater distance from the said platen. Thus, the end surfaces 30 and 31 are spaced edgewise of each other. In addition to this edgewise spacing, the ends 15 and 16 are also spaced slightly sidewise, that is, sprung relatively radially, and also endwise or longitudinally. Thus, the edge flange 22 does not lie in a common plane when in the mold but is slightly distorted, as illustrated in Fig. 3. This figure represents the shape of the frame convolution 20 after it has been ejected from the die member 5.

In order to provide a continuous unitary frame from this convolution, the ends 15 and 16 are sprung so that the entire flange 22 lies in a common plane and the end faces 30 and 31 lie in complementary fitting relation. When these end surfaces are in this position, they may be welded together by applying a coating of adhesive, such as acetone, thereto, and compressing them together until a permanent connection therebetween is formed.

The same result may be accomplished by providing a mold cavity in which the portion forming the flange 22 lies in the same plane, but with the ends 30 and 31 spaced from each other in a direction edgewise only. Still another mold of this type may be employed where this portion of the cavity lies in the same plane, but with the end portions 30 and 31 spaced from each other in a direction endwise.

In all of these instances, the ejecting operation may be accomplished in a manner similar to that described above, and after the convolution has been thus ejected, the complementary end faces may be provided with an adhesive and brought together to form a smooth, flush, and invisible joint.

The exact shape of the periphery of the mold cavity must be calculated so that when the complementary edge surfaces are brought into fitting relation, the periphery of the frame member is in the desired final shape.

The purpose in providing the frame member with a channel-shaped cross section and relatively thin walls is to conserve material. The thermoplastic cellulose acetate material used in the molding of this frame member is relatively expensive and a slight saving in material effects a considerable saving in the cost of manufacture. The material is particularly well adapted for decorative trim members of this character because it may be molded in solid colors as well as color combinations to harmonize with other trim.

From the above description, it will be seen that a novel one-piece frame member and the method and apparatus for forming this member has been provided. Although but one form of the present invention has been herein shown and described, it will be apparent to those skilled in the art that other forms may be employed without departing from the spirit and scope of the invention as defined in the appended claims.

Having thus described my invention, I claim:

1. The method of making a unitary decorative frame of thermally moldable material having a generally channel-shaped cross section with the opening of the channel facing substantially in the same direction as the surface defined by one edge of the frame, comprising molding a single convolution of thermally moldable material in a cavity of the desired length and cross section so that the ends of the convolution are slightly spaced from each other, providing accurate complementary surfaces on the said ends during the molding process, whereby the channel can be ejected by stripping the same from the mold and said complementary end surfaces can be brought into accurate fitting relation, and joined without requiring substantial distortion of the molded piece.

2. The method of making peripherally closed frames of elongated channel-shaped cross section in which the flanges extend substantially parallel to a plane which intercepts portions of the frame for its entire length, said method comprising molding the frame substantially to shape, but separated at one point, between dies which separate from each other in a direction normal to said plane in a manner to leave the base or web of the channel exposed and the flanges and web in embracing relation to a peripherally extending portion of one of the dies, thereby enabling stripping of the molded piece from said latter die, beginning with one of the separated ends of the piece, for subsequent jointure of the separated ends to complete the frame.

DWIGHT M. ANDERSON.